(12) United States Patent
Barrett (10) Patent No.: US 6,978,880 B2
(45) Date of Patent: Dec. 27, 2005

(54) CONVEYOR BELT CLEANING DEVICES, METHODS, AND SYSTEMS

(76) Inventor: Paul Barrett, 1784 Halbro Dr., Marietta, GA (US) 30062

( * ) Notice: Subject to any disclaimer, the term of this patent is extended or adjusted under 35 U.S.C. 154(b) by 0 days.

(21) Appl. No.: 11/076,075

(22) Filed: Mar. 9, 2005

(65) Prior Publication Data

US 2005/0199471 A1    Sep. 15, 2005

Related U.S. Application Data

(60) Provisional application No. 60/551,515, filed on Mar. 9, 2004.

(51) Int. Cl.[7] .............................................. B65G 45/00
(52) U.S. Cl. ...................................................... 198/495
(58) Field of Search ........................................ 198/495

(56) References Cited

U.S. PATENT DOCUMENTS

| | | |
|---|---|---|
| 1,543,411 A | 6/1925 | Wittig |
| 1,888,498 A | 11/1932 | Gipe et al. |
| 2,016,186 A | 10/1935 | Vail |
| 2,974,631 A | 3/1961 | Thompson |
| 3,583,544 A | 6/1971 | Prodzenski |
| 3,583,555 A | 6/1971 | Karsnaki |
| 3,978,972 A | 9/1976 | Lyle |
| 4,060,164 A | 11/1977 | Reilly |
| 4,080,974 A | 3/1978 | Oag |
| 4,104,081 A | 8/1978 | Totten |
| 4,423,745 A | 1/1984 | Butt et al. |
| 4,667,690 A | 5/1987 | Hannig |
| 4,685,553 A | 8/1987 | Jennings |
| 4,702,163 A | 10/1987 | Araki et al. |
| 4,860,883 A | 8/1989 | Knaul et al. |
| 5,058,728 A | 10/1991 | Leiweke et al. |
| 5,111,929 A * | 5/1992 | Pierick et al. ............... 198/495 |
| 5,443,139 A | 8/1995 | Scott |
| 5,524,746 A | 6/1996 | Massen et al. |
| 5,542,525 A * | 8/1996 | Kornely ...................... 198/495 |
| 5,613,594 A | 3/1997 | Kootsouradis |
| 6,367,613 B1 | 4/2002 | Montgomery |
| 6,740,172 B1 | 5/2004 | Griffiths et al. |
| 2002/0117381 A1 | 8/2002 | Montgomery |

* cited by examiner

*Primary Examiner*—Joe Dillon, Jr.
(74) *Attorney, Agent, or Firm*—Troutman Sanders LLP; Gerald R. Boss; James Hunt Yancey, Jr.

(57) ABSTRACT

The various embodiments of present invention provide cleaning devices, methods, and systems for cleaning conveyor belts and conveying systems. A conveyor belt cleaning device can include a bar having a first end, a second end, and an outer surface, and sprockets coupled to the outer surface. The conveyor belt cleaning device can also include nozzles coupled to the outer surface. The nozzles can define a spray pattern that converges upon the entire length of a conveyor belt. The bar can be utilized with any conveyor system. In addition, various types of sprockets and nozzles can be used in accordance with the present invention. The nozzles can also be positioned in nozzle rings extending around the bar, and multiple nozzle rings can be positioned along the length of the bar. Other embodiments are also claimed and described.

20 Claims, 5 Drawing Sheets

CONVEYOR BELT CLEANING DEVICES, METHODS, AND SYSTEMS

CROSS REFERENCE TO RELATED APPLICATION AND PRIORITY CLAIM

This Application claims the benefit of U.S. Provisional Application Ser. No. 60/551,515 filed on 9 Mar. 2004.

TECHNICAL FIELD

The present invention relates generally to cleaning systems and, more particularly, to cleaning devices, methods, and systems for cleaning conveyor belts and conveying systems while conveyor belts and systems are operating.

BACKGROUND

Conveyor systems are typically used to transport items. A conveyor system usually includes a conveyor belt and a plurality of cylindrically-shaped rollers. These roller can include drive and non-drive rollers. The rollers normally support the conveyor belt and to provide a constant or intermittent surface over which the conveyor belt can move. A conveyor system also usually utilizes one or more of the drive rollers to provide a driving force to the conveyor belt making the conveyor belt move over the cylindrically-shaped rollers. As the conveyor belt traverses the rollers, the non-drive rollers rotate so that the conveyor belt can transport items along a path formed by the rollers.

While conveyor systems are very useful in transporting items in many industries, cleaning the conveyor systems presents many challenges. Some of these challenges depend on the items being transported and the type of the conveyor belt used in a conveyor system. For example conveyor systems used to transport food or edible items, such as meats, vegetables, and fruits, must be kept clean and sanitized so that the food or edible items are kept clean. Indeed, it is also important to not allow food and other edible items to come in contact with bacteria or other harmful substances. Conveyor belts having gaps or openings in them allow liquids to seep through them and to come in contact with many parts of a conveyor system. The seeping liquid, depending on the items being transported, can also create unsanitary conditions for transporting items that must be transported in a clean, sanitary environment. For example, poultry processing plants may use wire conveyor belts in their conveying systems, and naturally occurring poultry fluids can seep through the wire conveyor belt potentially creating an unsanitary environment. In another example, particles of items being transported on a conveyor belt can become lodged in the belt and these particles can disrupt conveyor belt operation and also create unsanitary conditions for many items, such as perishable items.

One approach to clean conveyor systems is to clean them manually. Manual cleaning typically involves stopping the conveyor system, dismantling portions of the system, and then cleaning portions of the conveyor system by hand. While this method can be effective, it is very time consuming and also requires many man hours to complete the manual cleaning process. Other approaches to cleaning conveyor systems include using components of conveyor systems to clean the conveyor systems. For example, these conventional systems usually use a roller to rinse conveyor belts or a roller with scrubbers to clean a conveyor belt.

Conventional conveyor cleaning systems, while serving their respective purposes, have several drawbacks, and are limited in their cleaning abilities. For example, the conventional cleaning system disclosed in U.S. Pat. No. 3,583,544 ("the '544 patent") is designed specifically for a container rinser, and not for cleaning conveyor belts. In addition, the container rinser in the '544 patent does not have nozzles positioned along the length of a shaft or directly coupled to the shaft. Rather, the nozzles are placed on nozzle wheels centrally located on the shaft. Such nozzle location is generally undesirable for cleaning conveyor belts because the nozzles are not positioned appropriately to direct fluid along the entire length of a conveyor belt, but rather to only certain portions.

Likewise, the conventional conveyor cleaning systems disclosed in U.S. Pat. No. 6,367,613 ("the '613 patent") and U.S. Pat. No. 6,740,172 ("the '172 patent"), while serving their respective purpose, also have several drawbacks. These drawbacks include the inability to easily adapt with different size and type conveyor systems, difficult and complicated manufacturing processes, and difficulty in using the cleaning systems with various sized sprockets and conveyor belts, and different types of sprockets and conveyor belts. Further, the placement of the nozzles on the single elongated sprocket of the '613 patent limits the coverage area for fluids being emitted from the nozzles, thus preventing adequate cleaning of the conveyor belt.

As for the cleaning system in the '172 patent, it is intended only for modular-type conveyor belts, and utilizes a non-rotating shaft with sprockets that do not engage a conveyor belt due to the smooth surface on the sprockets. The sprockets of the '172 patent have a complex design having two sectors laterally staggered on the non-rotating shaft. The complex sprocket design prevents using non-specialized sprockets to clean conveyor belts. Lastly, the nozzles disclosed in the '172 patent only emit fluids in one direction and are not adapted to rotate and clean a conveyor belt that while rotating along with the conveyor belt. This nozzle placement precludes cleaning of multiple portions of a conveyor belt because the nozzles are directed to only a single portion of the conveyor belt.

Therefore, there is a need in the art for a conveyor belt cleaning device that is easy to manufacture, is simple to use, and increases the life span of conveyor belts.

Additionally, there is a need in the art for a conveyor belt cleaning system that can adequately and effectively clean a conveyor system while conveyor systems are operating.

Additionally, there is a need in the art for a conveyor belt cleaning device that uses non-specialized designed sprockets to adequately and effectively clean a conveyor system while conveyor systems are operating.

Yet still, there is a need in the art for a conveyor belt cleaning device that can be used with any conveyor belt type, and various sprockets having various sizes.

BRIEF SUMMARY

The various embodiments of the present invention provide devices, methods, and systems for cleaning conveyor belts and conveying systems. The embodiments of the present invention utilize clean-in-place technology to clean conveyor belts in a conveyor system while the conveyor system is operating. In addition, the embodiments of the present invention can be utilized to efficiently provide cleaning fluids to a conveyor belt so that cleaning fluids are not wasted. The embodiments of the present invention can utilize multiple sprockets to engage any sized conveyor belt and can be adapted to operate within any conveyor system. In addition, the embodiments of the present invention can increase the life span of a conveying belt since the conveyor belt can be cleaned while operating. Further, the embodiments of the present invention are strategically designed to accommodate sprocket positioning to provide adequate cleaning coverage for conveyor systems.

A preferred embodiment of a conveying belt cleaning device can comprise a bar having a first end, a second end, and an outer surface. A plurality of sprockets and nozzles can be coupled to the outer surface of the bar. A sprocket can be positioned along the bar between two nozzles. This positioning can enable the embodiments of the present invention to direct fluid onto a conveyor belt and the sprocket ensuring that the conveyor belt and sprocket are cleaned while operating as components of a conveyor system. The sprockets can be adapted to engage a conveyor belt and the nozzles can be adapted to direct a fluid, such as a cleaning fluid, onto the conveyor belt. A conveying belt cleaning device can further comprise a plurality of sprocket areas and a plurality of nozzle areas. The sprocket areas can be positioned between nozzle areas on the outer surface of the bar. The plurality of nozzles can define a spray pattern that surrounds the bar and, the spray pattern can converge upon the entire width of a conveyor belt.

These and other features as well as advantages, which characterize the various preferred embodiments of present invention, will be apparent from a reading of the following detailed description and a review of the associated drawings.

DETAILED DESCRIPTION OF PREFERRED EMBODIMENTS

The various embodiments of the present invention comprise conveyor belt cleaning devices, methods, and systems. The embodiments of the present invention provide a conveyor belt cleaning device with a spray bar having a unique positioning of sprockets and spray nozzles. A spray bar can be adapted to rotate around its central axis so that the sprockets and nozzles also rotate in the same direction of the spray bar. A spray bar according to the present invention can also include an outer surface defining one or more sprocket areas and one or more spray nozzle areas. The sprocket areas and the spray nozzle areas can be arranged or positioned along a spray bar so that a sprocket area is disposed between spray nozzle areas. In addition, a spray bar according to the present invention can have one or more sprockets coupled to the spray bar and nozzles placed on either side of the sprockets.

The various embodiments of the present invention can be used to clean a conveyor system while it is operating. In a preferred embodiment, one or more spray bars having spaced apart sprockets and nozzles can be mounted within a conveyor system at predetermined locations. For example, the spray bar can be mounted at the end of a conveyor belt and utilized as an end roller. The spray bar can be in liquid communication with a fluid source. The fluid source can provide fluid under pressure to a spray bar. The plurality of nozzles spaced-apart on the spray bar can be in liquid communication with the fluid source. When fluid is introduced to the spray bar, the spray bar can provide fluid to the nozzles, and fluid can be sprayed from the nozzles. Preferably, a sufficient number of nozzles are coupled to the spray bar to ensure that fluid sprayed from the spray bar contact many areas in a conveyor system, including a conveyor belt. In addition, preferably the nozzles are positioned along the spray bar to produce a spray pattern that overlaps the other nozzles, covers the width of a conveyor belt, and forms a cylindrically-shaped wall of water that extends radially from and surrounds the spray bar, and converges upon a conveyor belt.

Referring now the drawings, in which like numerals represent like elements, preferred embodiments of the present invention are herein described.

Figure 1:
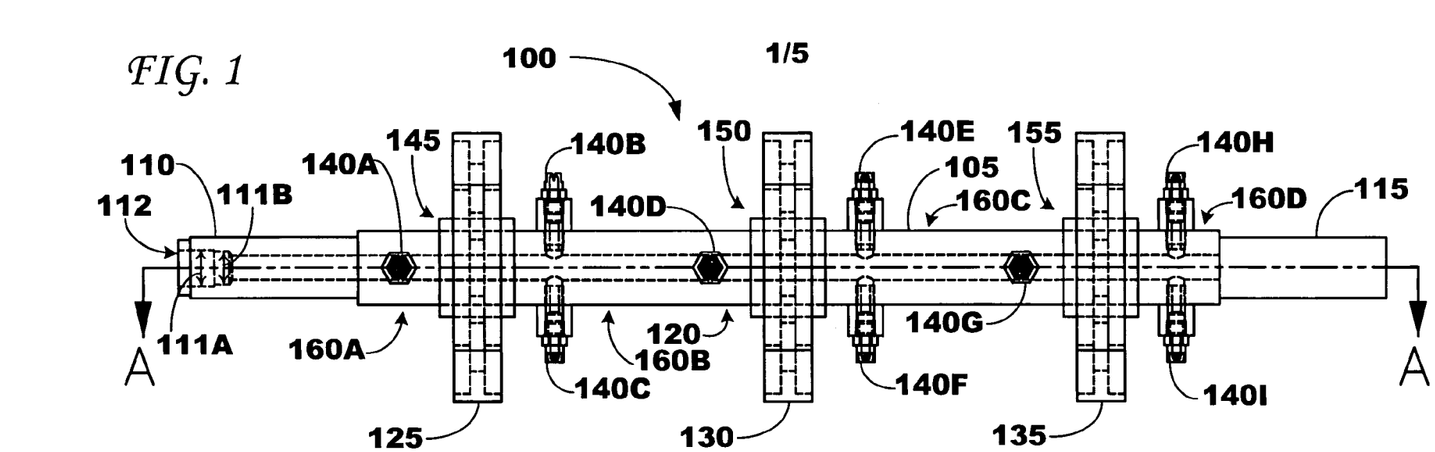
FIG. 1 illustrates a side view of a conveyor belt cleaning device in accordance with a preferred embodiment of the present invention.

FIG. 1 illustrates a side view of a conveyor belt cleaning device 100 in accordance with a preferred embodiment of the present invention. The device 100 can comprise a spray bar or rod 105 having a first end 110, a second end 115, and an outer surface 120. The terms bar and rod are used interchangeably to denote the spray bar 105. The spray bar 105 can also have a central axis A—A as shown in FIG. 1, and can be adapted to rotate about the central axis A–A. The spray bar 105 is preferably formed of stainless steel. Many other rigid materials can also be utilized to form the spray bar 105. These materials include, but are not limited to, nickel-plated steel, galvanized steel, or aluminum. Aluminum, for example, can be utilized to provide corrosion resistance.

The device 100 can also comprise one or more sprockets, such as a first sprocket 125, a second sprocket 130, and a third sprocket 135. The embodiments of the present invention will be discussed in detail with reference to three sprockets 125, 130, 135. It should be understood, however, that one or more sprockets can be utilized in accordance with the present invention, and that the below discussed embodiments with three sprockets 125, 130, 135 do not limit the various embodiments of the present invention. The sprockets 125, 130, 135 are preferably adapted to engage modular or wire conveyor belts. For example, the sprockets can have teethlike projections or other radial extensions to engage a modular or wire conveyor belt. Alternatively, the sprockets can have a substantially smooth outer surface with no teethlike projections.

The sprockets 125, 130, 135 are preferably adapted to circumscribe the outer surface 120 of the spray bar 105. For example, the sprockets 125, 130, 135 can have a bore size approximately the same as or slightly larger than the outer surface 120 of the spray bar 105 enabling the sprockets to engage the outer surface 120. The sprockets 125, 130, 135 can have various circumferences or diameters. For example, multiple sets of sprockets can be used to adapt the spray bar to use with varying conveyor systems having different sized conveyor belts. This feature of the various embodiments of the present invention enables a cleaning device according to the present invention to be used with any sized conveyor belt systems because the sprockets 125, 130, 135 can have any sized circumference or diameter.

The sprockets 125, 130, 135 can also be adapted to shift laterally during operation of the cleaning device. While the sprockets 125, 130, 135 are preferably coupled to the spray bar 105 so that the sprockets 125, 130, 135 do not laterally shift on the spray bar 105, the sprockets 125, 130, 135 can be adapted to engage a conveyor belt at various angles. For example, the sprockets 125, 130, 135 can wobble or move laterally so that the contact position between the sprockets 125, 130, 135 and a conveyor belt varies as the conveyor belt traverses over the sprockets 125, 130, 135. Such movement enables the sprockets 125, 130, 135 to vary contact points on a conveyor belt so that a cleaning fluid can be directed to many portions of a conveyor belt to adequately clean a conveyor belt.

The device 100 can also further comprise one or more spray nozzles, such as nozzles 140A–I, positioned along the length of spray bar 105. Other nozzles can be coupled to the spray bar 105, and the total number of nozzles can be determined by the width of a conveyor belt in a conveyor system. Preferably, one spray bar 105 is used for a conveyor belt. Alternatively, more than one spray bar 105 can be used on a conveyor belt. The nozzles 140A–I are preferably adapted to emit and direct fluids to the underside of a conveyor belt, cleaning a conveyor belt from the inside surface to the outside surface of a conveyor belt.

The nozzles 140A–I can be formed from a nozzle assembly or can be unitary components capable of being coupled to the outer surface 120 of the spray rod 105. The nozzles 140A–I are preferably formed of stainless steel, and are preferably conical spray nozzles. Alternatively, other nozzles formed of many other materials and having different spray patterns can also be used in accordance with various embodiments of the present invention. Preferably, the nozzles 140A–I are positioned to have overlapping spray patterns that spray the entire width of a conveyor belt. The nozzles 140A–I can also be positioned so that a spray pattern defined by the nozzles 140A–I forms a cylindrically-shaped water wall centered about axis A—A of the spray bar 105. The spray pattern defined by the nozzles can also surround the spray bar so that it converges upon the width of a conveyor belt being cleaned.

The device 100 can also comprise a fluid chamber 112 located within the spray rod 110. The fluid chamber 112 is preferably in liquid communication with the nozzles 140A–I to provide a fluid to the nozzles 140A–I. As shown in FIG. 1, the fluid chamber 112 can extend from the first end 110 of the rod 105 substantially to the second end 115 of the rod 105. In some embodiments, the fluid chamber 112 can extend the entire length of the rod 105, or multiple fluid chambers 112 can be disposed within the rod 105. Multiple fluid chambers 115 can also be utilized in some embodiments, and extend from each end 110, 115 into the rod 105. In a preferred embodiment, the fluid chamber 112 has a substantially circular-shaped cross section having a diameter ranging from approximately 7/16 inches to approximately 3/4 inches. Preferably, the fluid chamber 112 has a constant diameter along its length. Alternatively, the fluid chamber 112 can be shaped to have other cross-sectional diameters, other geographic shapes, multiple geographic shapes, and various cross-sectional diameters.

The fluid chamber 112 can define a fluid inlet 111 at the first end of the rod 110. Other embodiments can have an additional fluid inlet 111 at the second end of the rod 110. The fluid inlet 111 can be adapted to enable a fluid to pass through the fluid inlet 111 into the fluid chamber 112. The fluid inlet 111 can have a different diameter than the fluid chamber 112. For example, the fluid inlet 111 can have a diameter adapted to mate and seal with a rotary union or other fluid adapter, as discussed in greater detail below. In addition, the fluid inlet 111 may have portions 111A–B, having varying diameters so that the fluid inlet 111 can be coupled to or in liquid communication with the fluid chamber 112. In some embodiments, the fluid inlet 111 can be adapted to couple to a fluid source, so that the fluid source is in liquid communication with the fluid inlet 111 and the fluid chamber 112. For example, the fluid inlet 111 may be adapted to be connected to a fluid hose or other coupling mechanism providing water and cleaning chemicals to the fluid chamber 112. Alternatively, other fluids and gasses can be used in accordance with the present invention and provided to the fluid chamber 112 through the fluid inlet 111 under pressure.

The sprockets 125, 130, 135 and the nozzles 140A–I can be coupled to and positioned along the outer surface 120 of the spray bar 105. The outer surface 120 of the spray bar 105 can define sprocket areas 145, 150, 155 and nozzles areas 160A–D. The sprockets 125, 130, 135 may be coupled to the outer surface 120 within the sprocket areas 145, 150, 155. Similarly, the nozzles 140A–I can be coupled to the outer surface 120 within the nozzle areas 160A–D. The sprockets 125, 130, 135 can be spaced apart from each other on the outer surface 120. The nozzles 140A–I can also be spaced apart from each other and positioned between the sprockets 125, 130, 135. For example, the nozzles 140E–G can be disposed between sprockets 130, 135.

In addition, the nozzles 140A–I can be placed on either side of the sprockets 125, 130, 135 such that at least one of the sprockets 125, 130, 135 is generally disposed between one or more nozzles 140A–I. For example, the first sprocket 125 is disposed between nozzle 140A and nozzles 140 B–C. In a preferred embodiment of the present invention, four nozzles can be disposed between two sprockets. In another preferred embodiment, a sprocket can be disposed between four nozzles, or flanked by two nozzles. Other nozzle and sprocket arrangements are contemplated by the various embodiments of the present invention. For example, any number of nozzles can surround a sprocket or be placed between two sprockets. Alternatively, other nozzle positions can be used in accordance with the present invention. For example, in another preferred embodiment and as discussed in greater detail with reference to FIG. 4, one sprocket can be coupled to each side of a square-shaped spray rod 105 so that the four nozzles radially extend from each contiguous side of a square-shaped spray rod 105.

The sprockets 125, 130, 135 preferably have a radial diameter that extends further than the nozzles 140A–I do from the spray bar. Accordingly, the sprockets 125, 130, 135 can support a conveyor belt traversing the sprockets 125, 130, 135 so that conveyor belt forms a substantially planar surface. The substantially planar surface of the conveyor belt enables the nozzles to direct a spray pattern to the conveyor belt for cleaning the conveyor belt. In addition, when the spray bar 105 is utilized as an end roller, the sprockets 125, 130, 135 can engage conveyor belt so that the spray patterns emitted from the nozzles 140A–I overlap and cover the width of the conveyor belt.

Figure 2:
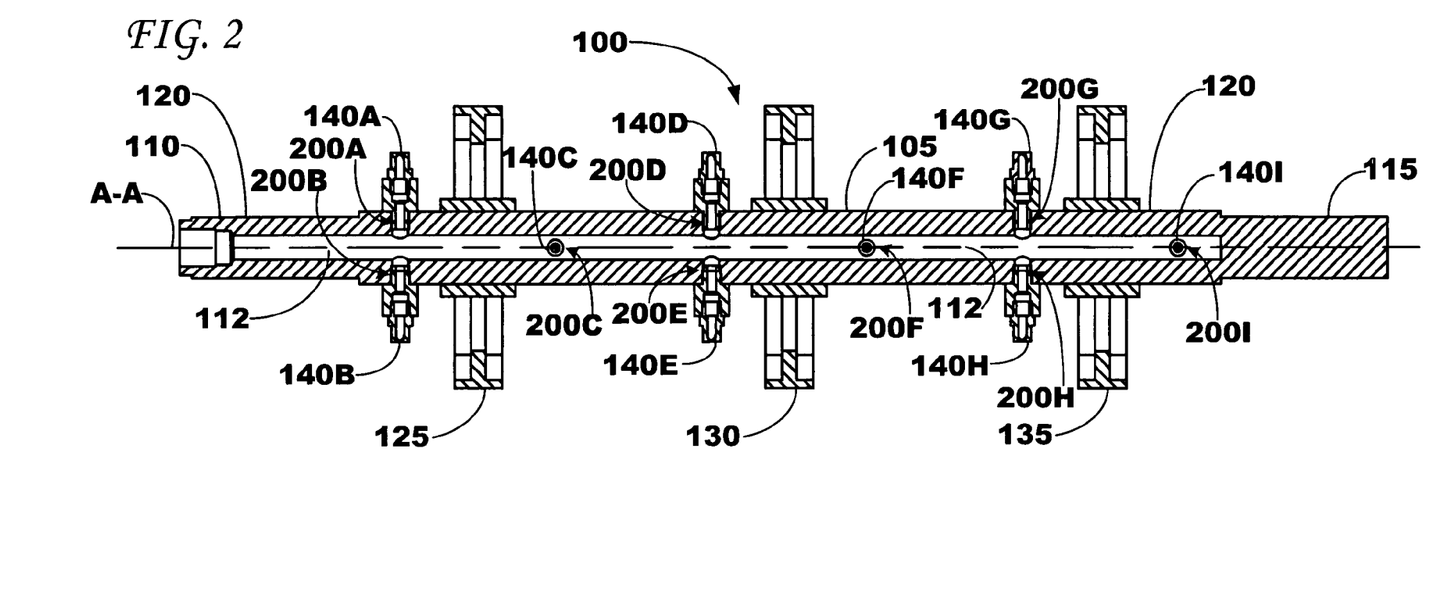
FIG. 2 illustrates a cross-sectional view of a conveyor belt cleaning device in accordance with a preferred embodiment of the present invention.

FIG. 2 illustrates a cross-sectional view of a conveying belt cleaning device 100 taken at its central axis A—A as shown in FIG. 1 in accordance with a preferred embodiment of the present invention. As discussed above, the device 100 generally comprises the rod 105 having the first end 110, the second end 115, and the outer surface 120. In addition, the rod 105 can also comprise or define the fluid chamber 112 disposed within the rod 105. The device 100 can further comprise one or more nozzles 140A–I positioned along the rod 105 such that each of the nozzles 140A–I is in liquid communication with the fluid chamber 112.

The nozzles 140A–I can be coupled to the outer surface 120 of the spray rod 105. In some embodiments, the nozzles 140A–I may be nozzle assemblies having a nozzle portion and a fitting portion. Alternatively, the nozzles 140A–I can be single unitary units coupled to the outer surface 120 of the spray rod. The spray rod 105 can contain numerous apertures 200A–I disposed between the fluid chamber 112 and the outer surface 120. The nozzles 140A–I, or fitting portions, can be inserted into and engage the apertures 200A–I. In some embodiments, the nozzles 140A–I or fitting portions can be threaded, thus enabling the nozzles 140A–I or fitting portions to be inserted into the apertures 200A–I, and firmly coupled to the spray rod 105. When fitting portions are utilized, nozzle portions can be inserted into and secured within the fitting portions creating the nozzles 140A–I extending outwardly from the spray rod 105.

The apertures 200A–I can be spaced apart from each other along the outer surface of the spray rod 105. The apertures 200A–I are preferably spaced apart from each and can be formed in alternating perpendicular pairs. In another preferred embodiment, the apertures 200A–I can be formed such that an aperture 200A–I is formed in each contiguous side of a spray bar. Other aperture arrangements can be utilized in other embodiments. For example, the apertures 200A–I can be placed in a helical pattern, a staggered pattern, or many other patterns suitable for efficiently emitting a fluid toward a conveyor belt and cleaning a conveyor belt. In addition, the apertures 200A–I can be positioned along the entire length of the spray rod 105 or positioned in certain areas along the length of the spray rod 105. For example, apertures 200A–I may not be proximate the first end 110 and 115 of the spray rod 105.

The apertures 200A–I can have various diameters and be threaded. Preferably, the apertures 200A–I have diameters ranging between approximately 0.33 inches and approximately 0.44 inches. Alternatively, other aperture diameters can be utilized, and in some embodiments, the apertures 200A–I can be threaded. For example, the apertures 200A–I can be threaded to have a thread of approximately 1/8 inches NPT or approximately 1/4 inches NPT (NPT=National Pipe Thread size scale).

Figure 3:
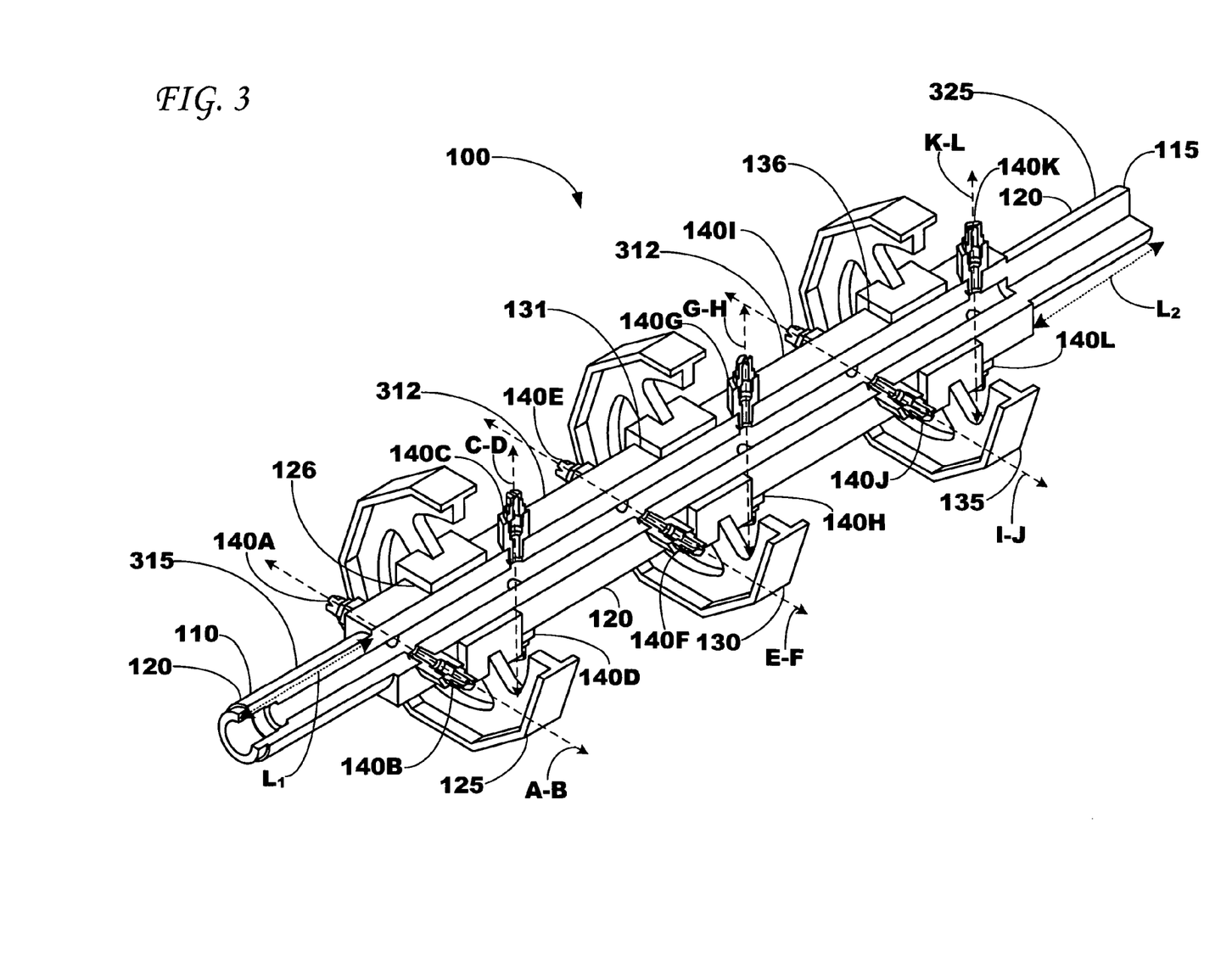
FIG. 3 illustrates a perspective view of a conveyor belt cleaning device in accordance with a preferred embodiment of the present invention.

FIG. 3 illustrates a perspective view of a conveyor belt cleaning device 100 in accordance with a preferred embodiment of the present invention. As shown, the device 100 generally comprises a spray bar 105, a plurality of nozzles 140A–L, and a plurality of sprockets 125, 130, 135. The spray bar 105 may have a first end 110, an intermediary section 312, and a second end 115. The intermediary section 312 can be generally disposed between the first end 110 and the second end 115. The nozzles 140A–L and the sprockets 125, 130, 135 can be positioned along and coupled to the spray bar 105 in the intermediary section 312. Alternatively, the nozzles 140A–L and the sprockets 125, 130, 135 can be positioned proximate the first and second ends 110, 115.

As shown in FIG. 3, the spray bar 105 can have an outer surface 120 with varying geometrical configurations. For example, a first end section 315 of the spray bar 105 can be cylindrically-shaped having a circular-shaped cross section, the intermediary section 312 of the spray bar 105 can be an elongated square having a square-shaped cross section, and a second end section 325 can be cylindrically-shaped having a circular shaped cross section. Cylindrically-shaped first end and second sections 315, 325 can engage a mount having bearings enabling the spray bar 105 to rotate about its central axis A—A. In a preferred embodiment of the present invention, the first end section 315 and the second end section 325 can have a diameter ranging from approximately one inch to approximately one and one half inches, and the intermediary section 312 can be square-shaped having four contiguous sides. Each side of the square-shaped intermediary section 312 can have a length ranging from approximately one inch to approximately one and one-half inches. In alternative embodiments, the outer surface 120 of the spray bar 105 can have many other geometrical shapes and can have substantially the same geometrical shape across the length of the spray bar 105. For example, the intermediary section 312 of the spray bar 105 can have substantially the same cross-sectional shape as the first and second end sections 315, 325. Additionally, the intermediary section 312 can have any number of contiguous sides in accordance with the various embodiments of the present invention.

The first end section 315 can be proximate the first end 105, and the second end section 325 can be proximate the second end 115. As shown in FIG. 3, the first end section 315 can have a first length $L_1$. Length $L_1$ can be the distance between the first end 110 and the intermediary section 312. Likewise, the second end section 325 can have second length $L_2$. Length $L_2$ can be the distance between the second end 115 and the intermediary section 312. The lengths $L_1$ and $L_2$ can vary according to the present invention so that the device 100 can be implemented in numerous conveyor belt systems. In some embodiments, the lengths $L_1$ and $L_2$ can range from approximately two inches to approximately twelve inches depending on the application.

The nozzles 140A–L can be spaced apart along the intermediary section 312 of the spray bar 105. As shown in FIG. 3, the nozzles 140A–L can be positioned in groups or sets on either side of the sprockets 125, 130, 135. For example, a first group of nozzles 140A–B can be generally positioned between the first end section 315 and the first sprocket 125, and a second group of nozzles 140C–F can be generally positioned between the first sprocket 125 and the second sprocket 130. Additionally, nozzles 140G–J can be positioned between sprockets 130, 135, and nozzles 140K–L can be positioned between the third sprocket 135 and the second section 325.

The nozzles 140A–L can be positioned in varying orientations. For example, the nozzles 140A–L can be orientated substantially perpendicular to the outer surface 120 of the spray bar 105. Alternatively, the nozzles 140A–L can be positioned in various other orientations not perpendicular to the outer surface 120 of the spray bar 105. Additionally, some of the nozzles 140A–L can have varying orientations when positioned along and coupled to the spray bar 105. For example, some of the nozzles 140A–L can be placed substantially perpendicular to the outer surface 120 of the spray bar 105, and some nozzles can be placed at various other angles. In some embodiments, the nozzles 140A–L can be positioned and orientated to direct fluid at certain components of a conveyor belt system enabling fluids to reach predetermined locations in a conveyor belt system. The nozzles 140A–L can be positioned so that they are laterally and longitudinally offset from each other. For example as shown in FIG. 3, nozzle 140A can be longitudinally offset from nozzle 140B and laterally offset from nozzle 140C. In addition, each of the other nozzles 140D–L can be similarly positioned along the length of the spray bar 105.

The nozzles 140A–L can also be positioned in nozzles pairs or similar sets. The nozzles 140A–L can also be orientated in pairs having a common central axis as shown in FIG. 3. For example, nozzles 140A–B have a common central axis A–B. Also, the nozzles 140A–L can be orientated so that alternating nozzle pairs have perpendicular central axes. For example, nozzles 140C–D have common central axis C–D that is perpendicular to axis A–B, which corresponds to nozzle pair 140A–B. And as shown, nozzle pairs 140E–F, 140G–H, 140I–J can be orientated to have a common central axis perpendicular to the next most nozzle pair. More specifically, axes A–B, E–F, and I–J can be perpendicular to axes C–D, G–H, and K–L. Additionally, multiple nozzle pairs or sets can be located between sprockets 125, 130, 135. For example, nozzle pairs 140C–D and 140E–F can be disposed between sprockets 125, 130. In some embodiments, more nozzles pairs or sets can be positioned between two sprockets or along the length of the spray bar 105.

The nozzles 140A–L used in accordance with the various embodiments of the present invention can have various characteristics. For example, the nozzles 140A–L can be, but are not limited to, fan spray nozzles, full cone nozzles, hollow cone nozzles, banding nozzles, or directional nozzles. A combination of different types of nozzles can be utilized on the spray bar 105 in accordance with some embodiments of the present invention. Preferably, the nozzles 140A–L are positioned to have overlapping spray patterns. In addition, the nozzles preferably define a spray pattern that surrounds the spray bar and contacts the width of a conveyor belt to clean the conveyor belt.

In addition, the nozzles 140A–L can have various sizes, such as pressure ratings. For example, the nozzles 140A–L can have pressure ranges ranging from approximately 60 PSI (lbs. per square inch) to approximately 500 PSI. A combination of nozzles having different pressure ratings can be utilized in accordance with some embodiments of the present invention.

The sprockets 125, 130, 135 can be spaced apart along the intermediary section 312 of the spray bar 105 between the first and second end sections 315, 325. The sprockets 125, 130, 135 can have an outer surface adapted to engage a conveyor belt. For example, the sprockets 125, 130, 135 can have a circular shaped outer surface or can have a plurality of projections extending from the sprockets 125, 130, 135 to engage a conveyor belt. Alternatively, as shown in FIG. 3 the sprockets 125, 130, 135 can have numerous contiguous sides adapted to engage a conveyor belt.

In addition, the sprockets 125, 130, 135 can be adapted to have an outer surface adapted to drive or impart force on a conveyor belt, or can have an outer surface adapted to engage a conveyor belt and rotate as the conveyor belt traverses the sprockets 125, 130, 135. The sprockets 125, 130, 135 can have radial extending projections or teeth to engage a conveyor belt to provide rotational energy and transmit power to a conveyor belt if the spray bar 105 is used as a drive roller.

The sprockets 125, 130, 135 used in accordance with the present invention can have different size characteristics. Utilizing different sprocket sizes and types enables the embodiments of the present invention to be used with numerous conveyor belt systems. For example, in some embodiments, the conveyor belt can be a wire-type or a modular-type conveyor belt, and the sprockets 125, 130, 135 coupled to the spray bar 105 can be adapted for use with these conveyor belt types. In addition, the embodiments of a belt cleaning device 100 of the present invention can utilize multiple sprocket sizes for use with any sized conveyor belt system. For example, the sprockets 125, 130, 135 can have diameters of ranging from approximately two and a half (2.5) inches to approximately fourteen inches.

Although the sprockets 125, 130, 135 can have varying diameters, preferably the sprockets 125, 130, 135 have a bore 126, 131, 136 adapted to circumscribe the outer surface 120 of the spray bar 105. For example, the sprockets 125, 130, 135 can have a square-shaped bore adapted to circumscribe the intermediary section 312 of the spray bar 105. Preferably, the bores of the sprockets 125, 130, 135 have a shape slightly larger that the spray bar 105 so that the sprockets can circumscribe the spray bar 105. In some embodiments, the bore of the sprockets 125, 130, 135 can have four sides of substantially equal length ranging from approximately one inch to approximately two and a half (2.5) inches. Alternatively, the sprockets 125, 130, 135 can have different shaped bores having numerous dimensions. For example, the bores 126, 131, 136 of the sprockets 125, 130, 135 can have a circular-shape, triangular-shape, octagonal-shape, and many other geometrical configurations.

Figure 4:
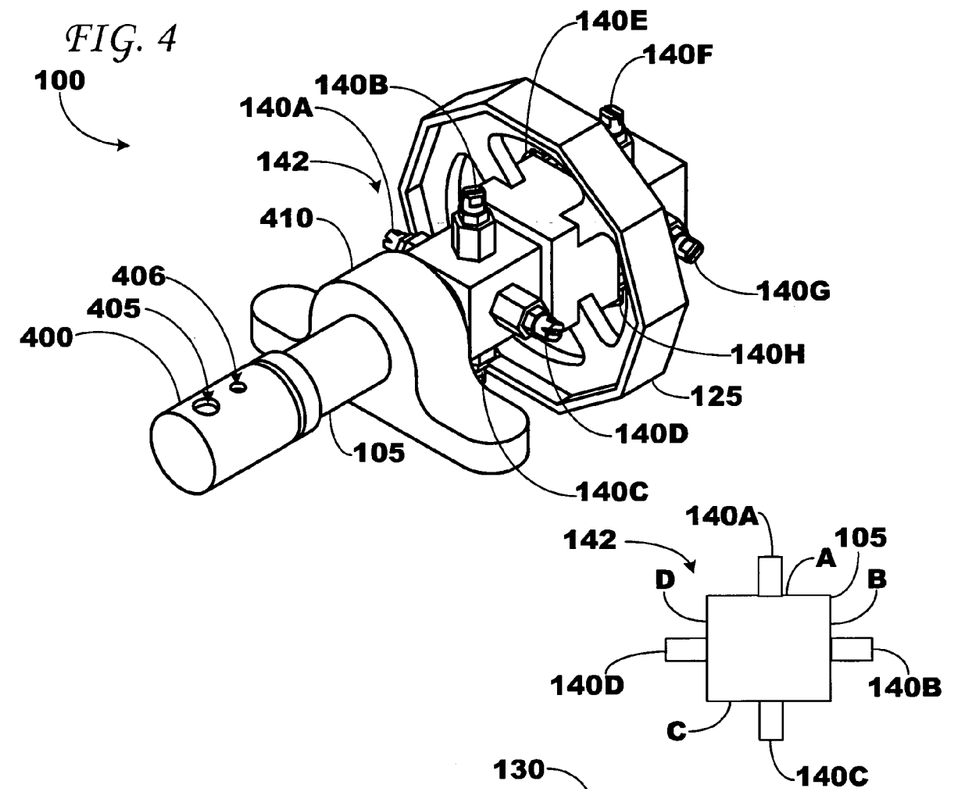
FIG. 4 illustrates a perspective view of an end of a conveyor belt cleaning device coupled to a rotary union adapted to introduce fluid to the conveyor belt device in accordance with a preferred embodiment of the present invention.

FIG. 4 illustrates a perspective view of an end of a conveying belt cleaning device 100 coupled to a rotary union 400 adapted to introduce fluid to the conveying belt device 100 in accordance with a preferred embodiment of the present invention. The rotary union 400 preferably has inlet passages 405, 406 adapted to receive one or more fluids and then provide the one or more fluids to the spray bar 105. Preferably, the inlet passages 405, 406 are adapted so that fluid hoses providing fluids to the spray bar 105 can be coupled to the inlet passages 405, 406. In a preferred embodiment, water can be provided to inlet passage 405 and a sanitizing fluid can be provided to inlet passage 406. The rotary union 400 can mix the one or more fluids provided to the rotary union 400 through the inlet passages 405, 406.

The rotary union 400 can be coupled to either end 110, 115 of the spray bar 105. Preferably, the rotary union 400 is coupled to the end 110, 115 having the fluid inlet 111, and is adapted to mate and seal with the fluid inlet 111. Coupling the rotary union 400 to the end 110, 115 having the fluid inlet 111 enables a fluid introduced to the rotary union 400 to be provided to the spray bar 105. The rotary union 400 can be cylindrically shaped as shown in FIG. 4.

The rotary union 400 enables fluid to be transmitted to the spray bar 105 while the spray bar 105 is rotating about its central axis A—A. Preferably, the rotary union 400 is adapted to remain stationary while the spray bar 105 rotates. For example, the rotary union 400 can contain bearings enabling the spray bar 105 to rotate within the rotary union 400 while the outside of the rotary union 400 remains substantially stationary. Keeping the rotary union 400 stationary prevents any fluid hoses that may be coupled to the inlet passages 405, 406 from winding around the rotary union 400 due to the rotational motion of the spray bar 105 about its central axis A—A.

Also as shown in FIG. 4, the spray bar 105 can be mounted within a mount 410. The mount 410 may include bearings enabling the spray bar 105 to rotate within the mount 410. In a preferred embodiment, each end 110, 115 of the spray bar is inserted into a mount such as mount 410 when installed into a conveyor system. For example, the device 100 is installed in a conveyor belt system such that each end of the spray rod 110, 115 can be rotatably mounted in a mount, such as mount 410. As shown in FIG. 4, the mount 410 can circumscribe at least a portion of the first or second side sections 315, 325.

Also as illustrated in FIG. 4, nozzles 140A–H can be positioned along the spray bar 105 such that two sets of four nozzles are positioned on either side of a sprocket in another preferred embodiment of the present invention. For example, the sprocket 125 is positioned between nozzles 140A–D and nozzles 140E–H. This nozzle positioning can extend along the length of the spray bar 105 such that two sets of four nozzles lie on either side of a sprocket. The four nozzle sets can form a nozzle ring 142 wherein each nozzle extends radially from the central axis A—A of the spray bar 105. The nozzle ring 142 enables a cleaning device 100 to constantly direct fluid on a conveyor belt as the movement of the conveyor belt over the sprockets 125, 130, 135 turns the nozzles 140A–D to supply a constant spray stream on the conveyor belt.

In addition and as shown in FIG. 4, the four nozzles 140A–D in a nozzle ring 142 can be coupled to each contiguous side A–D of a spray bar 105 having multiple contiguous sides A–D. For example, nozzle 140A can be coupled to side A, nozzle 140B can be coupled to side B, nozzle 140C can be coupled to side C, and nozzle 140D can be coupled to side D. Multiple nozzle rings 142 can be positioned along the outer surface 110 of spray bar in accordance with a preferred embodiment of the present invention. Preferably, a sprocket is disposed between at least one nozzle ring 142 in accordance with some embodiments the present invention.

Figure 5:
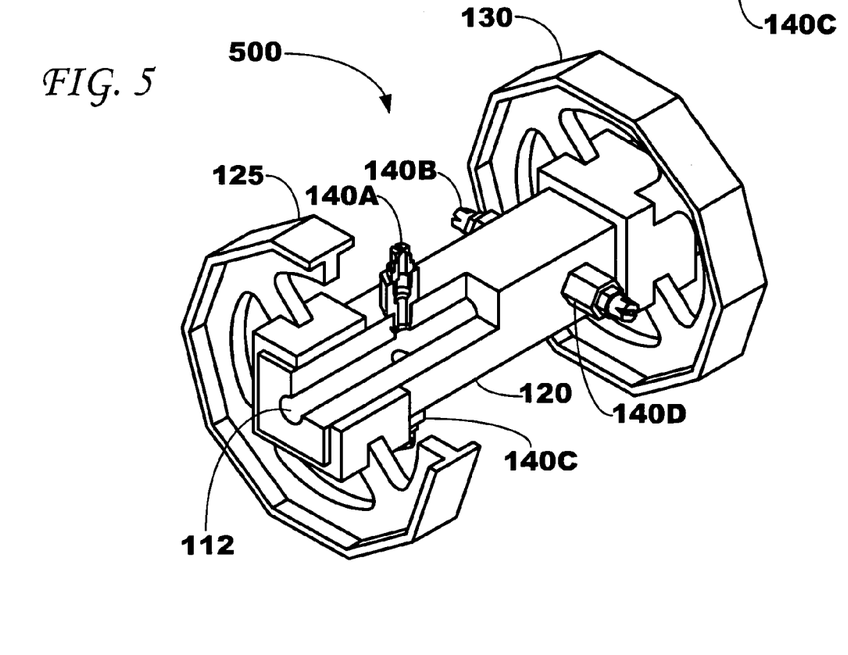
FIG. 5 illustrates a perspective view of a segment of a conveyor belt cleaning device in accordance with a preferred embodiment of the present invention.

FIG. 5 illustrates a perspective view of a segment 500 of the intermediary section 312 of a conveying belt cleaning device 100 in accordance with a preferred embodiment of the present invention. As shown, the sprockets 125, 130 can be coupled to the segment 500. A nozzle area 505 can be defined on the outer surface 120 of the segment 500 between the sprockets 125, 130. The nozzles 140A–D can be positioned between the sprockets 125, 130 on the outer surface 120 of the spray rod segment 500. Additionally, the nozzles 140A–D can be coupled to the fluid chamber 112 so that the nozzles 140A–D are in liquid communication with the fluid chamber 112.

Figure 6:
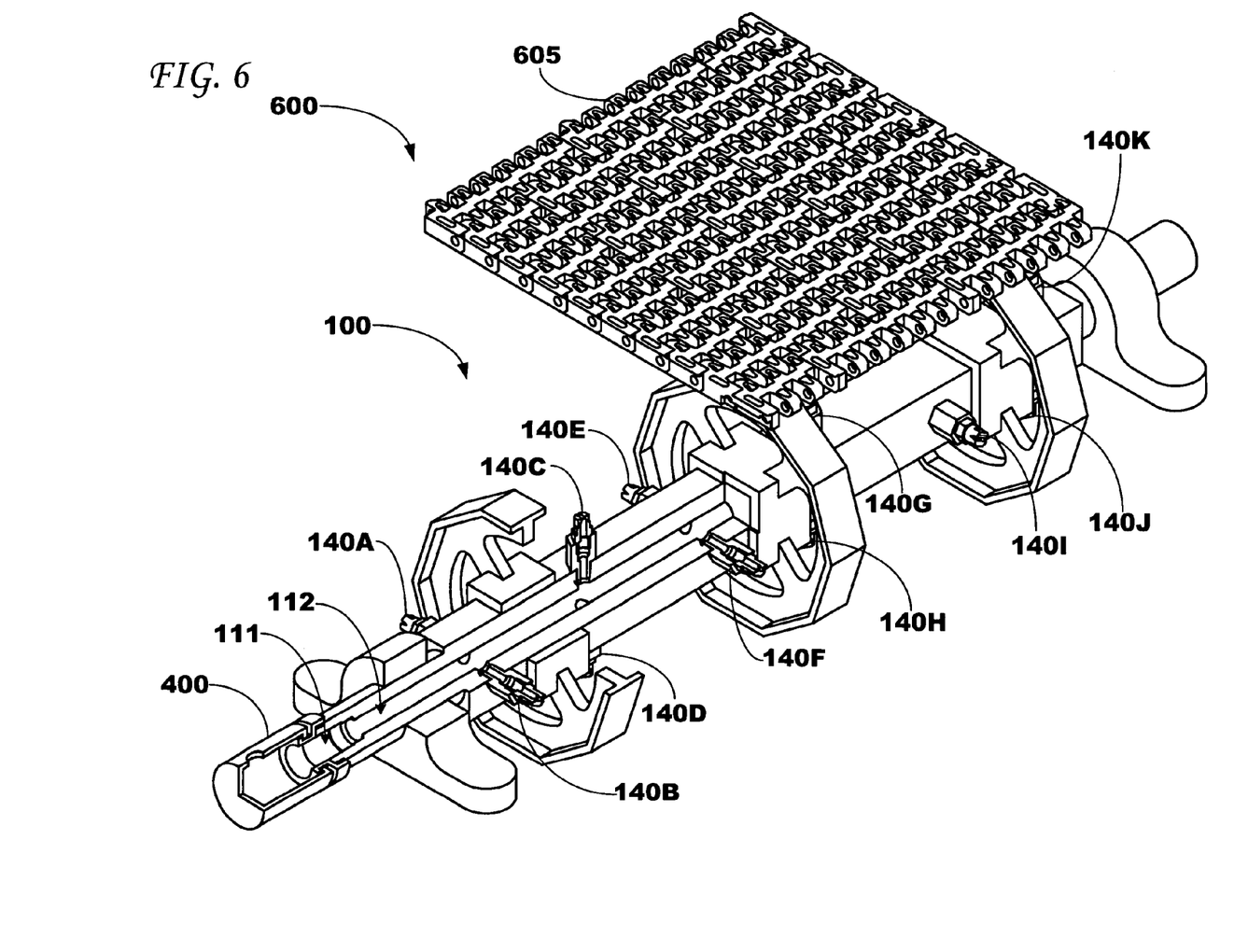
FIG. 6 illustrates a perspective view of a conveyor belt cleaning system comprising a conveyor belt and a cleaning device in accordance with a preferred embodiment of the present invention.

FIG. 6 illustrates a perspective view of a conveying belt cleaning system 600 in accordance with a preferred embodiment of the present invention. The system 600 can generally comprise a cleaning device 100 and a conveyor belt 605. The conveyor belt 605 can be many types of conveyor belts, including wire or modular conveyor belts. In addition, other types of conveyor belts having modular pieces or hinges can be cleaned using the various embodiments of the present invention.

As shown, a portion of a conveyor belt 605 can be adapted to engage the cleaning device 100. In operation, the conveyor belt 605 can provide rotational energy to the cleaning device 100 so that it rotates in concert with the conveyor belt 605. Fluid introduced to the inlet passage 405 of the rotary union 400 can enter the fluid inlet 111 and enter the fluid chamber 112. As fluid fills the fluid chamber 112, pressure on the fluid within the fluid chamber 112 increases. When the pressure on the fluid reaches a certain level within the fluid chamber 112, the pressurized fluid can exit the nozzles 140A–K. Fluid emitted from the nozzles 140A–K can be directed toward the conveyor belt 605 to rinse and clean the conveyor belt 605. In a preferred embodiment, the sprockets 125, 130, 135 extend further from the outer surface 120 spray bar 105 than the nozzles 140A–K enabling the nozzles 140A–K to direct fluid under pressure toward the conveyor belt 605.

The cleaning device 100 can be used to clean a conveyor belt 605 while the system 600 is operating. For example, the embodiments of the present invention enable a conveyor system 600 to be cleaned in place. The embodiments of the present invention can also be used to clean a conveyor system 600 while items are being transported on the conveyor belt 605, to ensure that the conveyor system remains clean while operating. One or more cleaning devices 100 can be used in a cleaning system 600 at predetermined locations along the path of a conveyor belt to clean the conveyor belt 605.

Figure 7:
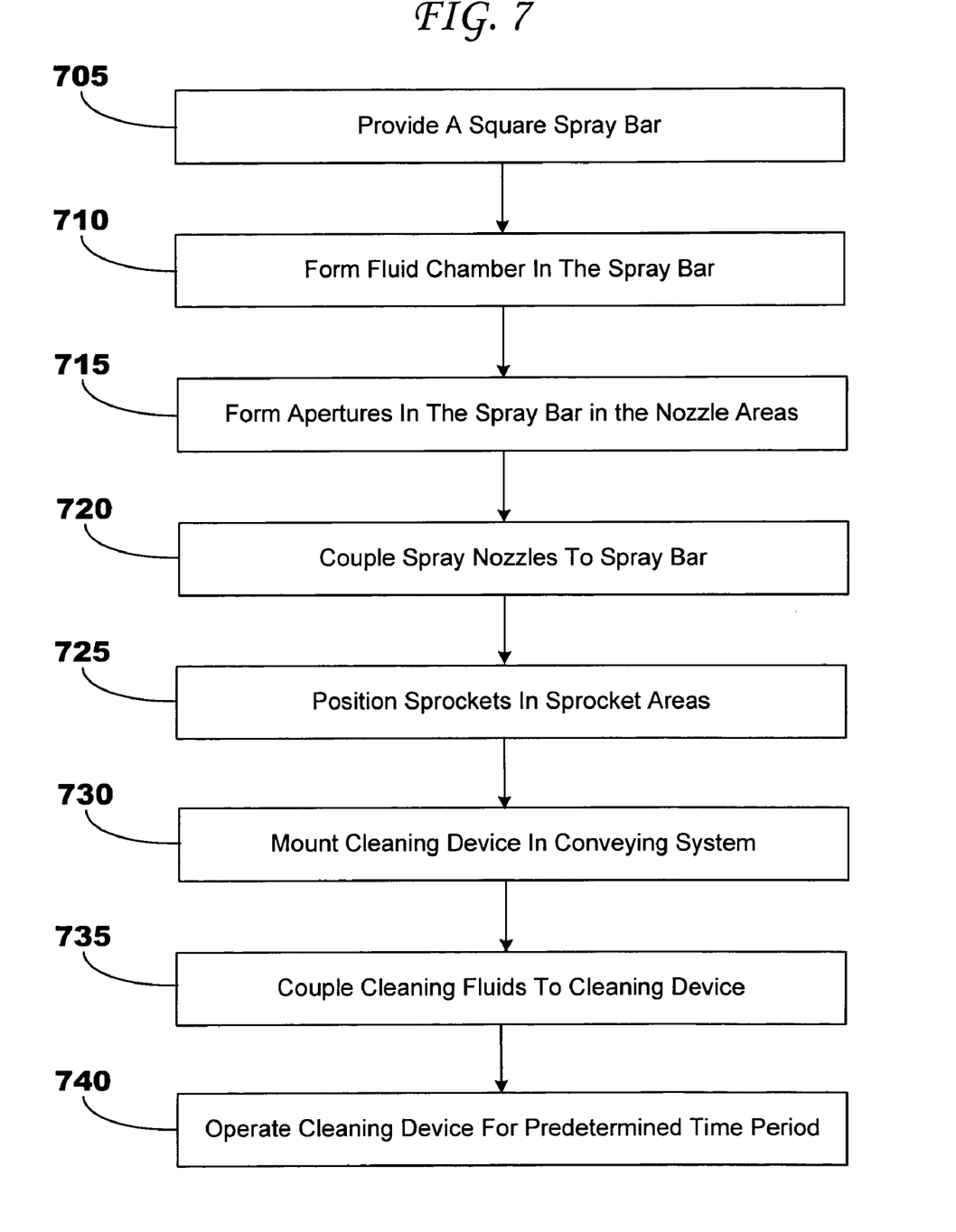
FIG. 7 is a logical flow diagram depicting a method of manufacturing a conveyor belt cleaning device in accordance with a preferred embodiment of the present invention.

FIG. 7 is a logical flow diagram depicting a method 700 to manufacture and use a conveyor belt cleaning device in accordance with a preferred embodiment of the present invention. It should be understood, that method 700 is only one method in accordance of the present invention, and that other methods exist. In addition, the method 700 can be performed in various orders that differ from the embodiment discussed herein.

Typically, a square spray bar can be provided to begin the method 700 (705). Preferably, the spray bar is stainless steel having four contiguous sides ranging in length from approximately one inch to approximately one and one-half inch. Spray bars having other dimensions or geographical configurations, such as circular shaped, can also be utilized. Next, a fluid chamber can be formed within the spray bar (710). Preferably, the fluid chamber is formed by drilling a hole lengthwise into the spray bar. In some embodiments, the fluid chamber can extend between the two ends of the spray bar. In other embodiments, the fluid chamber extends from one end of the spray bar into the spray bar, and does not extend all the way to the other end of the spray bar. The ends of the square bar can also be altered by lathing the ends into cylindrically shaped sections. These sections enable the spray bar to rotate about the central axis of the spray bar.

After the fluid chamber is formed into the spray bar, apertures can be formed into the spray bar (715). The apertures are preferably formed by drilling the outer surface of the spray bar to expose the fluid chamber. In some embodiments, the apertures are formed in nozzle areas located on the outer surface of the spray bar. Once apertures are formed and positioned along the spray bar, nozzles can be inserted into the apertures and coupled to the spray bar (720). The nozzles can be single units or can be nozzle assemblies formed of nozzle and fitting portions. Preferably, the nozzles are nozzle assemblies and a fitting portion is inserted into the apertures formed in the outer surface of the spray rod then a nozzle portion is inserted into the fitting portion. The nozzles can be positioned substantially perpendicular or at varying angular orientations in the various embodiments of the present invention.

When the nozzles are positioned along the spray bar, one or more sprockets can be positioned along and coupled to the spray bar (725). Preferably, the sprockets are positioned between nozzles and are spaced apart along the spray bar. In some embodiments, the sprockets can be removed and replaced with other sprockets so a cleaning device according to the present invention can be used in conveyor systems having conveyor belts or conveyor rollers of different sizes and shapes. Additionally, in some embodiments, the sprockets may only be positioned in certain portions or sections of the spray bar. The sprockets can be adapted to engage a plurality of different conveyor belt types including, but not limited to, wire-type and modular-type conveyor belts.

After positioning the sprockets on the spray bar, the cleaning device can be mounted in a conveyor system (730). Preferably, the cleaning device is rotatably mounted so that the cleaning device can clean the conveyor system while the conveyor system is operating. Next, a rotary union or other coupling device can be installed onto the cleaning device. The rotary union is preferably in liquid communication with a fluid supply so that a fluid can be provided to the cleaning device. One or more fluid supplies can then be coupled to the rotary union. For example, a water supply or sanitation fluid can be coupled to the cleaning device using one or more hoses coupled to the rotary union. The method 700 may finish by operating the cleaning device, and the conveyor system for a predetermined time period to thoroughly clean the conveyor system.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

I claim:

1. A conveyor belt cleaning device comprising:
a bar comprising a central axis, a first end, a second end, and an outer surface, wherein the bar is adapted to rotate about the central axis of the bar;
a plurality of sprockets coupled to the outer surface of the bar, wherein the sprockets are adapted to engage a conveyor belt; and
a plurality of nozzles coupled to the outer surface of the bar, wherein at least one of the sprockets is disposed between at least two nozzles and wherein the nozzles are adapted to rotate about the central axis of the bar, and wherein the nozzles and the bar rotate about the central axis of the bar;
wherein the plurality of nozzles define a spray pattern that surrounds the bar and converges upon the entire width of a conveyor belt.

2. The device of claim 1, the outer surface of the bar comprising a plurality of sprocket areas and a plurality of nozzle areas, wherein at least one sprocket area is positioned between two nozzle areas.

3. The device of claim 1, the bar defining a chamber adapted to provide a fluid to at least one of the nozzles.

4. The device of claim 1, wherein the bar has a portion having a square-shaped cross section.

5. The device of claim 1, the wherein the bar has a portion having a circular-shaped cross section.

6. The device of claim 1, wherein a portion of the plurality of nozzles are arranged in a nozzle ring extending around the outer surface of the bar to provide a constant spray stream to a conveyor belt.

7. The device of claim 6, wherein the sprockets have a diameter that extends further from the outer surface of the bar than the nozzles to support a conveyor belt and provide a substantially planar conveyor belt surface, and wherein the nozzles provide a portion of the spray pattern on the substantially planar conveyor belt surface.

8. The device of claim 1, wherein at least one of the nozzles is substantially perpendicular to the outer surface of the bar.

9. The device of claim 1, wherein the plurality of sprockets comprises a first set and a second set, wherein the first set and second set of sprockets are adapted for use with different conveyor belt systems.

10. A method of making a conveyor belt cleaning article comprising:
providing a bar having a first end, a second end, an outer surface, and a central axis;
positioning a first and a second sprocket on the outer surface of the bar such that the sprockets are spaced apart on the bar, wherein a first nozzle area is defined between the first end of the bar and the first sprocket, a second nozzle area is defined between the first sprocket and second sprocket, and a third nozzle area is defined between the second sprocket and the second end of the bar;
positioning a first nozzle group in the first nozzle area, a second nozzle group in the second nozzle area, and a third nozzle group in the third nozzle area; and
adapting the bar, the sprockets, and the nozzles to rotate about the central axis of the bar wherein the bar, the nozzles and the sprockets rotate about the central axis of the bar.

11. The method of claim 10, wherein positioning the first, second, and third nozzle groups further comprises coupling the nozzles to the bar in the first, second, and third nozzle areas.

12. The method of claim 10, wherein at least one of the nozzle areas has a square-shaped cross section.

13. The method of claim 10, further comprising forming a chamber within the bar, wherein the chamber is adapted to provide fluid to at least one of the nozzles.

14. The method of claim 10, further comprising coupling a rotary union to at least one of the first and second ends of the bar such that the rotary union is in liquid communication with at least one of the nozzles, wherein the rotary union is adapted to remain substantially stationary.

15. The method of claim 14, further comprising providing fluid to the rotary union.

16. A conveyor belt cleaning apparatus comprising:
a rod comprising a central axis, a first end, a second end, and an intermediary portion disposed between the first end and the second end, wherein the rod is adapted to rotate about the central axis of the rod;
a first and a second sprocket coupled to and spaced apart on the intermediary portion of the rod; and
a first nozzle group coupled to the rod and disposed between the first end of said rod and the first sprocket; a second nozzle group coupled to the rod and disposed between the first sprocket and the second sprocket; and a third nozzle group coupled to the rod and disposed between the second sprocket and the second end of said rod,
wherein the sprockets and the nozzle groups are adapted to rotate about the central axis of the rod and wherein the nozzle groups and the sprockets rotate about the central axis of the bar.

17. The apparatus of claim 16, further comprising a chamber defined by the rod adapted to provide fluid to the first, second, and third nozzle groups.

18. The apparatus of claim 16, wherein the first, second, and third nozzle groups each comprise four nozzles.

19. The apparatus of claim 16, wherein the intermediary portion of the rod has a square-shaped cross section.

20. The apparatus of claim 16, wherein the first and second sprockets have a radial length greater than the nozzles in the first, second, and third nozzle groups to support a conveyor belt and provide a substantially planar conveyor belt surface, and wherein the nozzles provide a portion of the spray pattern on the substantially planar conveyor belt surface.

* * * * *